July 14, 1970 — S. W. TEHON — 3,520,195
SOLID STATE ANGULAR VELOCITY SENSING DEVICE
Filed Oct. 11, 1965 — 3 Sheets-Sheet 1
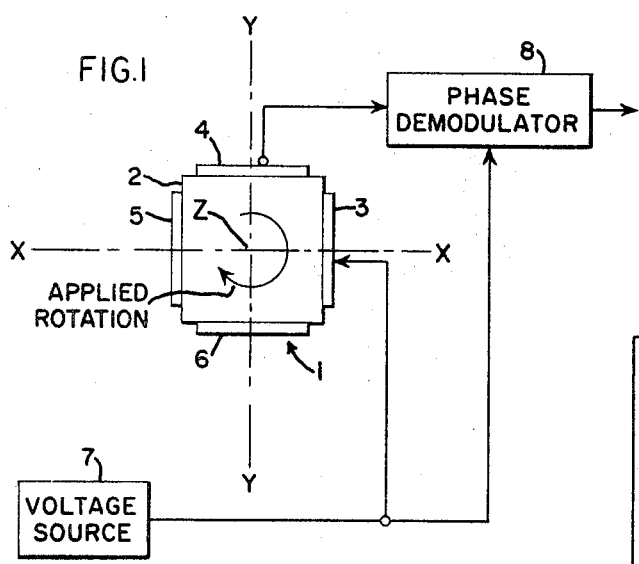
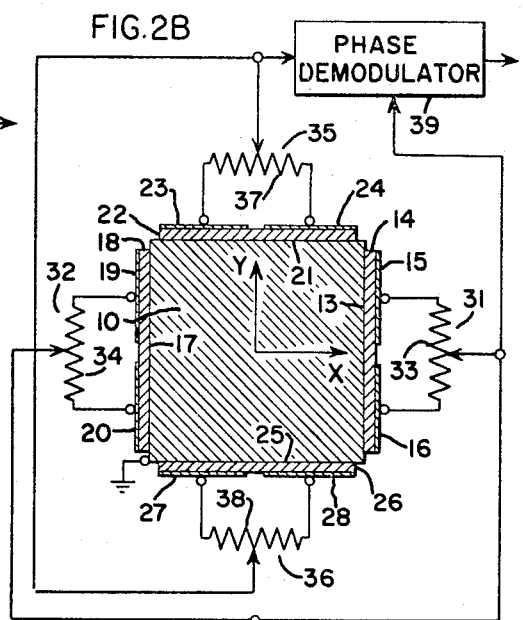
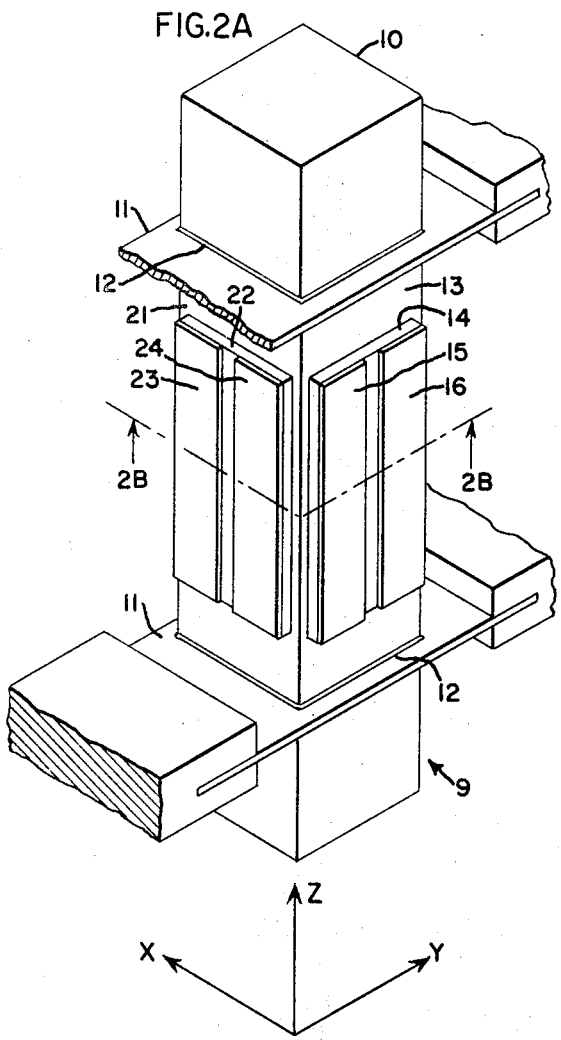
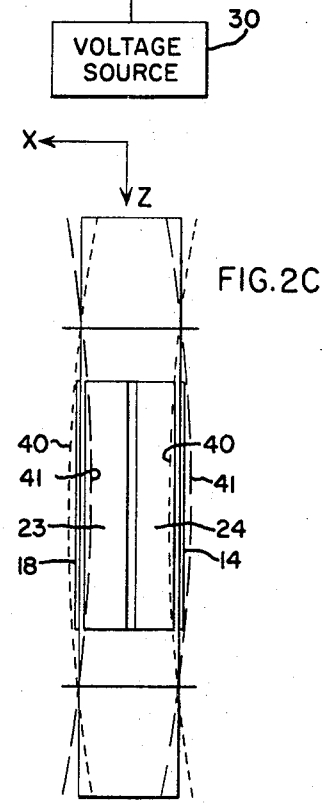
INVENTOR:
STEPHEN W. TEHON,
BY Marvin Goldenberg
HIS ATTORNEY.

July 14, 1970     S. W. TEHON     3,520,195
SOLID STATE ANGULAR VELOCITY SENSING DEVICE
Filed Oct. 11, 1965     3 Sheets-Sheet 2
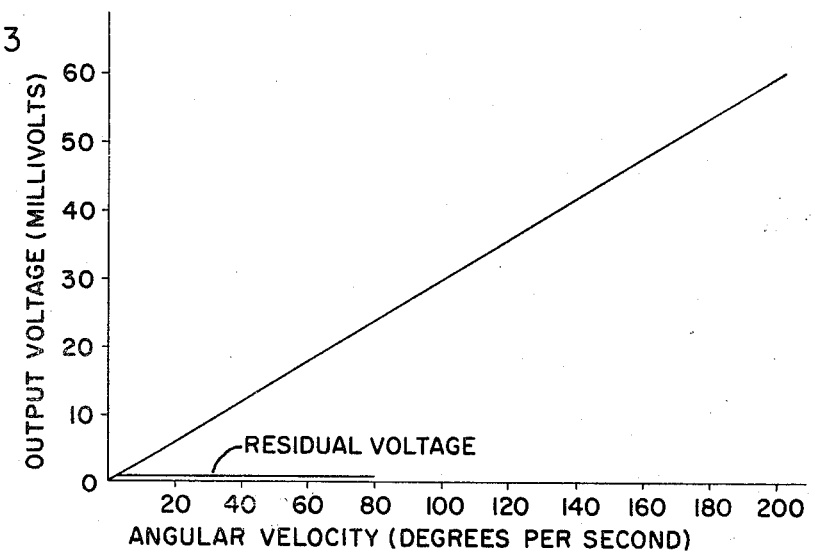
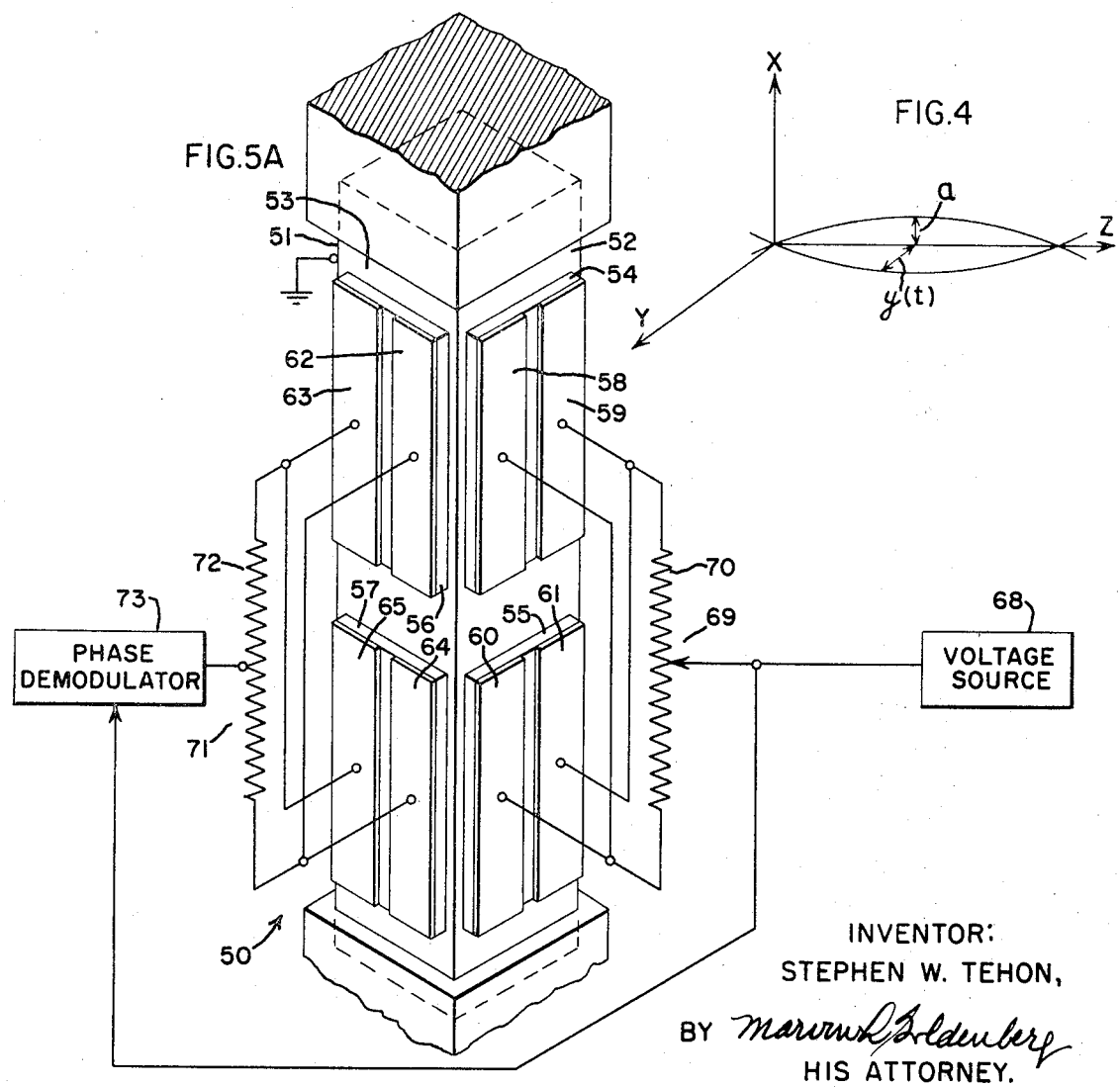
INVENTOR:
STEPHEN W. TEHON,
BY *Marvin L. Goldenberg*
HIS ATTORNEY.

July 14, 1970  S. W. TEHON  3,520,195
SOLID STATE ANGULAR VELOCITY SENSING DEVICE
Filed Oct. 11, 1965  3 Sheets-Sheet 3

INVENTOR:
STEPHEN W. TEHON,
BY Marvin L. Goldenberg
HIS ATTORNEY.

United States Patent Office 3,520,195
Patented July 14, 1970

---

3,520,195
SOLID STATE ANGULAR VELOCITY SENSING DEVICE
Stephen W. Tehon, Clay, N.Y., assignor to General Electric Company, a corporation of New York
Filed Oct. 11, 1965, Ser. No. 494,601
Int. Cl. G01p 15/00
U.S. Cl. 73—505                                    23 Claims

ABSTRACT OF THE DISCLOSURE

A solid state device for sensing angular velocity exhibiting long lifetime, high sensitivity to rotational motion, and compensation of spurious effects for reducing output error. The device comprises a vibratory rod having coupled thereto first and second orthogonally arranged transducer means. Said first transducer is energized to produce vibrations of said rod in a first transverse direction, and said second transducer develops a voltage in response to Coriolis force induced vibrations in a second transverse direction which are produced by rotational motion of said rod about its longitudinal axis.

---

The invention relates to solid state angular velocity sensing devices of the type which employ vibrating elements for sensing rotational motion by means of Coriolis forces developed within said elements. They are termed "solid state" devices in that they make use of their properties as a solid. These devices are also referred to in the art as vibratory gyroscopes. In particular the invention relates to novel devices of the above described type which offer considerable improvement over known devices, particularly with respect to providing highly accurate outputs and a relatively simple construction.

Vibrating gyroscopes of the present day commonly employ either piezoelectric or magnetostrictive transducer elements for developing voltages from vibrations caused by an angular velocity imparted to the device. One common form of vibratory gyro employs a tuning fork that is set into vibration, and upon being rotated develops a vibratory torque within its shank that is linearly related to the angular velocity of rotation.

Vibratory gyroscopes offer a great number of advantages over the conventional rotating type gyrosocpe, some of which are as follows: Having no bearings, they possess a long lifetime and are devoid of random frictional errors; they may be made of small size and light in weight; they are readily and inexpensively manufactured; their power requirements are low; no warm-up time is required; and they have a very large dynamic range. Although they also have an extreme intrinsic sensitivity, in practical realizations of the devices the sensitivity is often limited and may be considerably less than that of the conventional rotating gyro. The limited sensitivity is largely attributable to spurious vibrations of the device that may be set into motion during the operation by a physical imbalance of the structure as well as external causes, and also a lack of sensitivity in the read-out mechanism.

It is accordingly an object of the invention to provide a novel solid state angular velocity sensing device which is constructed to have a greatly improved sensitivity as compared with existing devices, as well as retaining the desirable properties of these devices.

It is a further object of the invention to provide a novel solid state angular velocity sensing device from which the output voltage can be readily and accurately obtained.

It is another object of the invention to provide a novel device of the type above set forth having a relatively simple and inexpensive construction.

It is yet a further object of the present invention to provide a novel angular velocity sensing device of the type above described which employs piezoelectric transducer elements for inducing vibrations and for deriving output voltages from the induced vibrations.

It is still another object of the invention to provide a novel angular velocity sensing device which is constructed so as to compensate for spurious effects in the operation and to establish a minimum error voltage in the output.

In accordance with the invention in its basic form, there is employed a vibratory central body member in the form of a rod having an approximate 90° rotational symmetry about its longitudinal axis so as to exhibit approximately equal resonant frequencies of vibration in orthogonal directions, which are the drive and read-out directions. Symmetrically mounted on at least one surface of opposing longitudinal surfaces of the rod is a piezoelectric transducer element excited by an alternating voltage for causing vibrations of the rod in the drive direction, which is at right angles to the opposing surfaces. Symmetrically mounted on at least one surface of further opposing longitudinal surfaces of the rod wihch are orthogonal to the drive surfaces, is a further piezoelectric transducer element for detecting vibrations of the rod in the read-out direction caused by angular velocities of a rotation about the longitudinal axis of the rod. Thus, in response to an applied angular velocity of the rod about the longitudinal axis, initiated vibrations of the rod in the drive direction are partially transformed into vibrations in the read-out direction as a result of the effective Coriolis forces.

In accordance with a further aspect of the invention, the drive transducer element is divided along the longitudinal axis of the rod and the drive potential is separately applied to each half of the element through a potentiometer. The potentiometer is adjusted for exciting the divided element so as to compensate for small vibrations in the read-out direction that tend to exist due to structural imbalance of the device, which might otherwise produce an appreciable error in the output voltage. Similarly, the read-out transducer element is divided and each half of the element is separately connected to the output through an adjusted potentiometer so as to compensate for voltages that tend to be generated by the read-out elecent due to vibrations in the drive direction.

In accordance with one specific embodiment of the invention, the ends of the rod are free, the rod being supported at the nodal points of the vibrations.

In a second specific embodiment of the invention, the ends of the rod are clamped and are supported in this fashion.

In a third specific embodiment of the invention the drive transducer elements are excited by a circuit arrangement connecting the sensing device, through these elements, in the feedback path of an amplifier so as to provide an oscillatory circuit wherein the drive voltage is certain to be at the natural resonant frequency of the device in the drive direction.

While the specification concludes with claims which set forth the invention with particularity, it is believed that the invention, both as to its organization and method of operation, will be better understood from the following description taken in connection with the accompanying drawings in which:

FIG. 1 is a schematic diagram of a solid state angular velocity sensing device, in accordance with the invention, connected in a general circuit configuration;

FIG. 2A is a perspective view of one embodiment of a sensing device employed in a modified circuit corresponding to FIG. 1;

FIG. 2B is a cross sectional view of the device of FIG. 2A taken along the line 2B—2B, including the electrical connections made to the device;

FIG. 2C is a front view of the device of FIG. 2A;

FIG. 3 is a graph illustrating the operation of the device of FIGS. 2A to 2C;

FIG. 4 is a diagram employed in explaining the operation of the device of FIGS. 2A to 2C;

FIG. 5A is a perspective view of a further embodiment of the invention in which both ends of the device are clamped;

Figure 5B:
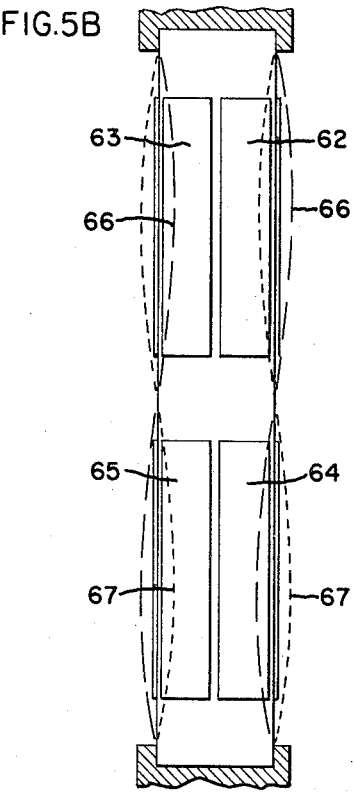
FIG. 5B is a front view of the device of FIG. 5A.

Referring now to FIG. 1, there is illustrated a schematic diagram of a solid state angular velocity sensing device 1, which is connected in a general circuit configuration, in accordance with the invention, for providing a measurement of angular velocity of said device about the Z axis. The device 1 includes an elongated central body member 2 having coupled to the surface thereof a drive piezoelectric transducer element 3 and an orthogonally arranged read-out piezoelectric transducer element 4. Also coupled to the body member 2 are elements 5 and 6 which, as shown, are not coupled in the circuit but are merely dummy elements for providing a symmetrical and physically balanced structure. In other embodiments, it will be seen that these elements may be piezoelectric transducer elements that are coupled into the circuit.

A source of alternating voltage 7 at a frequency corresponding to the resonant frequency of the body member 2 in the X direction is applied to transducer element 3 for generating rectilinear vibrations of element 3 and the body member 2. In the absence of a rotational motion of the device 1 about the Z axis, the generated vibrations will be entirely in the direction of the X axis, assuming an optimum operation of the device. In response to motion about the Z axis there are generated Coriolis forces in the direction of the Y axis, which forces are well known to be exerted in a direction orthogonal to the directions of the drive force and the axis of rotational motion, and to be proportional to the angular velocity of said motion. The Coriolis forces produce vibrations of the body 2 in the Y direction. The vibratory motion in the Y direction is coupled to read-out transducer element 4 and generates an alternating read-out voltage which is at the frequency of the applied voltage modulated in amplitude by a signal linearly related to the angular velocity imparted to the device. The read-out voltage is coupled to a conventional phase demodulator network 8, to which is also coupled a reference voltage from source 7, so as to provide at the output thereof a DC output voltage the magnitude and polarity of which provide a measure of the angular velocity magnitude and direction, respectively, of the applied angular velocity.

With reference to FIG. 2A, there is illustrated in a perspective view one specific embodiment of a solid state angular velocity sensing device 9, in accordance with the invention. In this embodiment the device is vibrated in a free-free mode wherein both the ends of the device are unattached. Further, the transducer elements are divided for cancelling spurious responses in the output, for reasons to be explained in detail. The central body member of the device 9 is in the form of a metal rod 10 of approximately square cross section, the longitudinal axis of which extends in the Z direction. The rod 10 is clamped to a mounting structure at the nodal points of the fundamental frequency vibrations, approximately .224 of the length from each end, by metal plates 11 having central cut out portions. Rubber grommets 12 are fitted in shallow grooves cut in the rod and the cut out portions are secured to the rod by means of said grommets. The essential compositional characteristics of the central body member are that it be dimensionally stable and be a low loss material, having a mechanical Q of at least 1000. Many of the hard metals are suitable for use, stainless steel having been employed in several operable embodiments of the invention. However, materials such as fused silica (glass) and comparable substances having the indicated characteristics can also be used. Further, the essential structural characteristics of the central body member is that it have an approximate 90° rotational symmetry about its longitudinal axis. This is necessary in order that the body exhibit approximately equal resonant frequencies of vibrations in the drive and read-out directions, vibrations generated by the Coriolis forces being thereby supported with appreciable intensity. Thus, although a rod of approximately square cross section is well suited to satisfy the above requirement as well as permitting a ready attachment of the transducer elements, the central body member can assume other configurations such as that of a circular or polyhedral rod.

Upon one longitudinal surface 13 of the rod 10 is bonded a piezoelectric transducer element 14 divided in the longitudinal direction by having a pair of electrodes 15 and 16, in this example of fired silver, deposited upon each half of the element. A conventional epoxy or solder bond is suitable for the transducer elements. Upon the opposing longitudinal surface 17, shown in the cross sectional view of FIG. 2B, is bonded a second drive piezoelectric transducer elment 18 divided in the longitudinal direction by having a pair of silvered electrodes 19 and 20 deposited upon each half of the element. In the example being considered transducer elements 14 and 18 are mounted on their respective surfaces with reverse polarizations. Upon one surface 21 of the remaining pair of opposing longitudinal surfaces of the rod 10 is bonded a read-out piezoelectric transducer element 22 divided by a pair of electrodes 23 and 24 deposited upon each half of the element. Upon the opposing read-out surface 25, shown in FIG. 2B, is bonded a second read-out piezoelectric transducer element 26 divided by a pair of electrodes 27 and 28 deposited upon each half of the element. Transducer elements 22 and 26 are mounted on their respective surfaces with reverse polarizations. All of the piezoelectric elements are symmetrically positioned with respect to each other on the rod surfaces and the deposited electrodes are also symmetrically positioned so as to assist in maintaining a dynamic balance and a uniform vibration of the device 9 to the maximum extent possible.

The esential characteristics of the piezoelectric transducer elements are that they be dimensionally stable with respect to environment over a long period, and that they have a relatively high dielectric constant, e.g., on the order of several hundred and higher. They should also have a reasonably good Q, on the order of 100. Many of the ferroelectric ceramic materials are suitable, such as lead zirconate titanate, which has been employed in the operable embodiment being considered, barium titanate, and lead metaniobate. A newly developed material, lithium niobate, appears to be well suited for this application. In addition, piezoelectric crystals satisfying the above constraints can also be used.

An alternating drive voltage is applied in a parallel arrangement from a source 30 to electrodes 15 and 16 of transducer 14 through a potentiometer 31, and to electrodes 19 and 20 of transducer 18 through potentiometer 32. The rod 10 is grounded. Potentiometer 31 includes a tapped resistor 33 connected at one end to electrode 15 and at the other end to electrode 16. Potentiometer 32 includes a tapped resistor 34 connected at one end to electrode 19 and at the other end to electrode 20. The adjustable taps of potentiometers 31 and 32 are connected jointly to voltage source 30.

A potentiometer 35 is coupled to electrodes 23 and 24 of transducer 22, and a further potentiometer 36 is coupled to electrodes 27 and 28 of transducer 26. Potentiometer 35 includes a tapped resistor 37, one end of which is connected to electrode 23 and the other end of which is connected to electrode 24. Potentiometer 36 includes a tapped resistor 38, one end of which is connected to electrode 27 and the other end of which is connected to electrode 28. The adjustable taps of potentiometers 35 and 36 are joined together and connected to a phase demodulator 39, to which is also connected a reference voltage from source 30. From demodulator 39 is provided the output of the device.

As will be explained in detail presently, the described drive circuitry acts to suppress vibrations in the read-out direction, along the Y axis, due to imbalance of the physical structure of the device, and thus avoid spurious responses in the output from this effect. Correspondingly, the described read-out circuitry cancels voltages generated at the output electrodes derived from vibrations in the drive direction, along the X axis, which vibrations are unavoidably coupled in some measure to the read-out transducers.

In the operation of the device 9, an alternating drive voltage is applied through potentiometers 31 and 32 to separate halves of the piezoelectric elements 14 and 18, for vibrating the elements in the X direction, the voltage being coupled to the transducer elements 14 and 18 in opposing senses because of their inverse polarizations. The frequency of the drive voltage is, for maximum efficiency, closely equated to the resonant frequency of vibrations of the rod 10 in the X direction, the resonant frequency being determined by the dimension of the rod in this direction. During each one-half cycle of the drive voltage, transducer elements 14 and 18 tend to change their thickness dimension in opposite directions. For example, for one-half cycle element 14 will tend to increase in thickness and element 18 to decrease in thickness. The resulting stresses produce a flexing of the rod, as shown by the broken lines 40 in the front view of FIG. 2C. During the opposite half cycle of the drive voltage, the inverse effect will occur and the rod is flexed in the opposite direction, as indicated by the broken lines 41 in FIG. 2C. Thus, in response to the drive voltage, the rod will vibrate in flexure at the drive frequency.

Because a perfectly balanced structure is in practice not realizable, in response to the drive voltage there will be a component of vibration in the read-out direction, resulting in an error component in the output voltage. The split drive transducer arrangement, more specifically in this example the split electrode structure, and the excitation circuitry therefor, provide a means for minimizing this error component. Upon analysis it may be appreciated that an unequal excitation of separate halves of each drive transducer element will tend to produce a secondary flexural vibration of the rod 10 in the read-out direction. For example, if electrode 15 receives a slightly greater potential than electrode 16 so that the transducer element portion under electrode 15 increase in thickness to a greater extent than does the portion under electrode 16, the rod will be seen to tend to bend in the direction of electrode 15. For the opposite voltage condition, bending will be towards electrode 16. Thus, through adjustment of the taps of the potentiometers 31 and 32 an excitation of the drive transducer elements can be produced that effectively and substantially cancels out any tendency for vibrations to occur in the read-out direction that result from an imbalance of the structure after vibrations are initiated by the drive voltage.

In addition, the drive vibrations in the X direction will be seen to change the dimensions of the read-out transducer elements 22 and 26 and thus tend to produce a second error component in the output voltage. The split read-out electrode structure and the read-out circuitry provide a means for minimizing the second error component. For example, consider a positive half cycle of the drive voltage supplied to the drive transducer elements so as to bend the rod in the direction indicated by the broken lines 40. For this condition the portions of transducer elements 22 and 26 under electrodes 23 and 27 will expand and the portions under electrodes 24 and 28 will contract. Thus, in the example being considered, a positive potential will be generated at the electrodes 23 and 27 and a negative potential will be generated at electrodes 24 and 28. For the opposite half cycle of the drive voltage, the opposite polarity voltages will be generated at these electrodes. With the voltages connected to the ends of resistors 37 and 38 180° out of phase, the adjustable taps of potentiometers 35 and 36 can be adjusted so as to effectively cancel out in the output, the voltage contributions of the read-out transducer elements 22 and 26 due to the vibrations in the drive direction. Accordingly, for an optimum adjustment of the drive potentiometers 31 and 32 and the read-out potentiometers 35 and 36, the null residual voltage at the output, which is that voltage resulting from excitations other than a rotational motion of the device about the Z axis, is made a minimum. It is desirable that the null residual voltage be as close to zero as possible in order that error in the output voltage be a minimum and the sensitivity of the device be maximum. Thus, with zero angular velocity applied to the device 9, only a minimum null residual voltage appears at the output of the phase demodulator 39. In response to an angular velocity of the rod about the Z axis, there will be produced a resulting flexural vibratory motion in the read-out direction due to Coriolis forces. The resulting flexural vibrations in the Y direction produce an alternating variation in the thickness dimension of transducer elements 22 and 26 so as to generate an output voltage that is linearly related to the applied angular velocity. Transducer element halves under electrodes 23 and 24 undergo equal dimensional changes in response to the Y directed vibrations and the read-out voltages generated at electrodes 23 and 24 are coupled in phase and in parallel to the phase demodulator 39. Transducer element halves under electrodes 27 and 28 also undergo equal dimensional changes for coupling the voltages generated at electrodes 27 and 28 to demodulator 39 in phase and in parallel with each other as well as with the voltages generated at electrodes 23 and 24. The output from phase demodulator 39 is a DC voltage the magnitude of which is linearly related to the angular velocity magnitude and the polarity of which corresponds to the direction of the rotational motion.

In FIG. 3 is presented a graph of the output voltage from phase demodulator 39, expressed in millivolts, plotted against angular velocity, expressed in degrees per second. It is seen that a linear response is provided for angular velocities of from a fraction of a degree per second to several hundred degrees per second. In practice, operable embodiments of the device have been found to be sensitive down to angular velocities on the order of thousandths of a degree per second, and with a linear dynamic range extending to on the order of 1500 degrees per second. For the extreme sensitivity indicated, the null residual voltage due to spurious effects has been maintained on the order of several microvolts.

To further describe the operation of the device 9 in a somewhat more rigorous manner, consider the motion envelop diagram of FIG. 4. In response to the alternating drive voltage, the instantaneous displacement ($x(t)$) of the center of the rod in the X direction may be given as:

$$x(t) = a \sin \omega_t \qquad (1)$$

where $a$ is the maximum amplitude of vibration and $\omega$ is the drive voltage frequency. The velocity ($v$) of the vibratory rod in the X direction is then:

$$v = dx/dt = -a\omega \cos \omega_t \qquad (2)$$

For an angular velocity ($\Omega$) about the Z axis applied to the vibratory rod, the consulting Coriolis force ($f$) is proportional to the cross product of the vector vibrational velocity ($v$) and the vector angular velocity ($\Omega$), and may be expressed as:

$$f = m(2v \times \Omega) \qquad (3)$$

where $m$ is the effective mass of the vibrating rod.

From the above equations there can be derived an expression for displacement of the rod in the Y direction as a function of time ($y(t)$) due to the Coriolis forces, as follows:

$$y(t) = \frac{-Q\Omega a}{\omega} 2 \cos \omega_t \quad (4)$$

Equation 4 is the basic transfer function of the solid state angular velocity device. It may be seen from Equation 4 that the sensitivity of the device is dependent upon the amplitude of vibration ($a$), the drive frequency ($\omega$) and the Q of the circuit. Although these factors are interrelated, they will be for the present considered separately. It appears desirable to have the maximum possible displacement ($a$). However, from a physical standpoint the maximum displacement is limited by the fatigue properties of the material, and care must be taken to insure operation below the material's endurance limit. In addition, the previously mentioned characteristics of the material, dimensional stability and loss properties normally take precedence.

With respect to the Q, it may be seen from Equation 4 that the sensitivity is proportional to the Q. However, there is a limit as to how high the Q can be made. Ferroelectric ceramic transducer elements of high dielectric constant, which are most suited for use in the disclosed angular velocity sensing device, have Q values that are relatively low, on the order of 100. Piezoelectric materials that have high Q are often found to have other properties that are undesirable, such as low dielectric constants or poor dimensional stability. The overall Q of the device is provided by the combined Q of the transducer and the Q of the rod. It has been found that a composite Q of about 1,000 can be readily realized using the materials mentioned, which is sufficient for relatively good sensitivity.

A a further consideration, high Q circuits exhibit a rapid phase change through the pass band of the circuit, making it difficult to provide the proper phase matching in the output circuit that would be required for cancellation of the spurious voltage components in the output. Accordingly, dimension of the rod 10 in the Y direction is made to be slightly different from the dimension in the X direction, differing typically by one percent, so that the resonant output frequency is slightly offset from the resonant input frequency. Thus, the difficult phase matching problem is avoided. In addition, operation of the device in this manner provides an increase in bandwidth, which is a measure of the device's capability to respond to rapid changes in angular velocity. For example, with a composite Q of about 1,000 and a drive frequency on the order of one kilocycle the bandwidth is about 1 cycle per second at the 3 db point for a resonant operation, but can be made on the order of 10 cycles per second for an off resonance operation. Although an off resonance operation causes reduced coupling between the input and output energy and therefor a reduction in sensitivity, additional amplification may be readily provided which compensates for this effect.

In the exemplary embodiment of the invention illustrated in FIGS. 2A, 2B, and 2C, the following material dimensions and circuit parameters may be employed. These are given for purposes of illustration and are not intended to be limiting:

Stainless steel rod:
  Length—5 in.
  Cross section—about .125 in. x .124 in.
  Input resonant frequency—950.5 cycles/sec.
  Output resonant frequency—959 cycles/sec.
Lead zirconate titanate transducers:
  Thickness—.05 in.
Alternating drive voltage—several volts With reference to FIG. 5A, there is illustrated in a perspective view a further embodiment of a solid state angular velocity sensing device 50 in which the ends of the device are fixed, the device operating in a clamped-clamped mode. As in the previous embodiment, the device 50 includes a central body member in the form of a rod 51. In the operable embodiment illustrated only a single drive surface 52 and a single read-out surface 53 are employed, dummy elements being mounted on the opposing surfaces for strucural balance. Further, the rod 51 is driven at its first overtone frequency so that the output will not be sensitive to vibrational shock as it would tend to be if vibrated at the natural resonant frequency. For this reason, as will been seen there are provided a pair of drive piepoelectric transducer elements 54 and 55 bonded to surface 52 and a pair of read-out piezoelectric transducer elements 56 and 57 bonded to surface 53. Transducer elements 54 to 57 have a length that is about one-fourth the length of the rod 51 and are centered on their respective halves of the rod. Transducer elements 54 is divided by electrodes 58 and 59, and the transducers element 55 is divided by electrodes 60 and 61. Transducer element 56 is divided by electrodes 62 and 63, and the transducer element 57 is divided by electrodes 64 and 65. The transducers and the electrodes are symmetrically arranged so as to provide a balanced structure and uniform vibrations. The split element construction is provided on the drive side and the read-out side so as to minimize the null residual voltage at the output, in a similar manner as described with respect to the previous embodiment.

A source of drive voltage 68 is connected through a potentiometer 69 in a parallel arrangement to the electrodes 58 through 61 of drive transducer elements 54 and 55. The tapped resistor 70 of potentiometer 69 is jointly connected at one end to electrodes 59 and 61, and is jointly connected at the other end to electrodes 58 and 60. The adjustable tap of potentiometer 69 is coupled to the voltage source 68. Correspondingly, a potentiometer 71 is connected to read-out transducer elements 56 and 57. The tapped resistor 72 of potentiometer 71 is jointly connected at one end to electrodes 63 and 65, and is jointly connected at the other end to electrodes 62 and 64. The adjustable tap of potentiometer 71 is connected to a phase demodulator 73, which has also connected thereto a reference voltage from source 68.

Drive transducer elements 54 and 55 are of inverse polarization so as to vibrate in phase opposition. Accordingly, upon being energized at the first overtone resonant frequency of vibrations by the described input circuit transducers 54 and 55 vibrate the rod in the drive direction at this frequency so that the nodal points occur at the center and at the ends of the rod, as shown by broken lines 66 and 67 in the front view of FIG. 5B. Read-out transducer elements 56 and 57 are also of inverse polarization so as to develop voltages that are of like phase in response to vibrations in the read-out direction.

The operation of the device 50 is essentially as described with regard to the device of FIGS. 2A, 2B, and 2C and need not, therefore, be further described.

Figure 6:
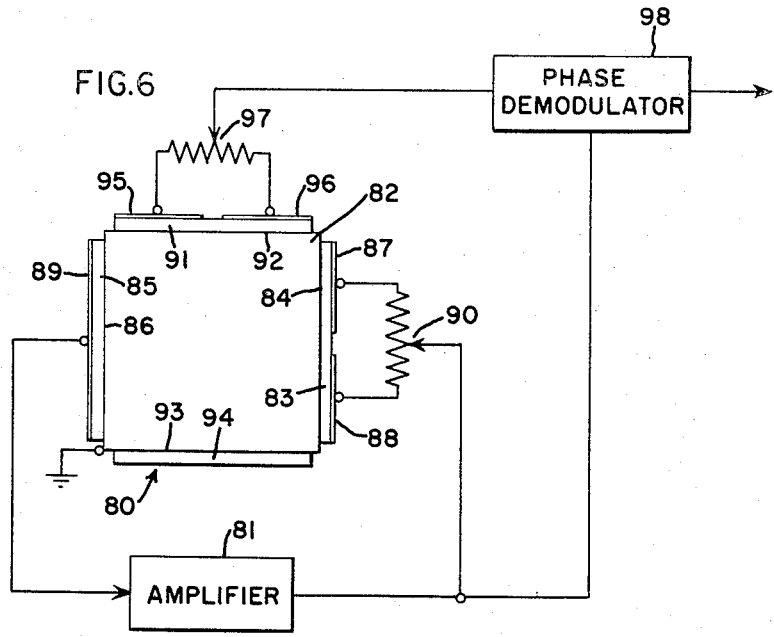
FIG. 6 is a schematic diagram illustrating a modified drive arrangement for the sensing devices of the type disclosed.

In FIG. 6 there is illustrated a further modification of the invention wherein a modified drive circuit is employed. The vibrating device 80 is driven by being connected in the feedback path of an amplifier network, the amplifier being illustrated by block 81. The feedback connection provides a stable oscillator circuit wherein the amplifier applies the necessary drive voltage to device 80, and is therefore automatically and precisely adjusted to the proper frequency.

The device 80 which can be either of the clamped or free end type is illustrated in a general manner and includes a central rod 82. A single drive piezoelectric transducer element 83 is bonded to a first drive surface 84, and a single piezoelectric transducer element 85 is bonded to the opposing drive surface 86. Transducer element 83 is divided by electrodes 87 and 88 for reducing the null residual voltage, as previously explained. A single electrode 89 is deposited upon transducer element 85. A connection is made from the output of amplifier 81 through a potentiometer 90 to electrodes 87 and 88 and from electrode 89 to the input of amplifier 81.

There is further provided a single read-out piezoelectric transducer element 91 bonded to a first read-out surface 92. On the opposing read-out surface 93 is bonded a dummy element 94 for providing a balanced structure. Transducer element 91 is divided by electrodes 95 and 96, which electrodes are coupled through a potentiometer 97 to one input of phase demodulator 98. The output of amplifier 81 is also connected to phase demodulator 98 as a reference potential. A DC output voltage is obtained from the phase demodulator which, as before described, is a linear function of angular velocities about the longitudinal axis.

The operation of the circuit of FIG. 6 is similar to that previously described except that the rod 82 is driven from a single side with the opposing drive side being employed to generate a voltage in response to the drive vibrations, which is accomplished by transducer element 85. The voltage generated in this manner is fed back to the amplifier network and re-applied to the drive transducer element 83 in proper phase. The amplifier network 81 provides the proper phase shift for producing oscillation. In addition, the network provides a limiting function, which may be accomplished by a Zener diode connected at the input of the amplifier for limiting the voltage applied to the amplifier and thereby limiting the output voltage from the amplifier that is used to drive the vibrating device.

The read-out is shown to be taken from a single read-out transducer element, this being but a minor modification from that previously shown. There is accordingly provided half the current that is available when using both read-out surfaces for deriving the output voltage. However, it does provide a simplified structure and for that reason is desirable for certain applications.

Although the invention has been described with respect to several specific embodiments for the purpose of clear and complete disclosure, it is not intended that the invention be thus limited. Accordingly, it is recognized that numerous modifications may occur to ones skilled in the art which are within the teachings herein provided. For example, in the embodiment of FIGS. 5A and 5B a single transducer element can be employed each having four electrodes deposited thereon in a similar configuration as illustrated in FIG. 5A. Further, rather than employing a construction wherein the electrodes are split in the longitudinal direction, as disclosed, the transducer elements can be physically split prior to being bonded to the rod.

The appended claims are thus so be construed as embodying all modifications that fall within the true scope of this invention.

What I claim as new and desire to secure by Letters Patent of the United States is:

1. An angular velocity sensing device comprising:
   (a) an elongated body member of relatively fixed dimensions composed of a material exhibiting low mechanical loss for vibratory motion,
   (b) first transducer means coupled to a first longitudinal surface of said body member for producing rectilinear vibrations of said body member in a first transverse direction, said first transducer means being divided in the longitudinal direction and halves thereof separately excitable so as to compensate for spurious vibrations in a second transverse direction orthogonal to said first direction, and
   (c) second transducer means coupled to a second longitudinal surface of said body member orthogonally disposed with respect to said first surface for developing a voltage in response to vibrations in said second transverse direction which are produced by rotational motion of said body member about its longitudinal axis.

2. An angular velocity sensing device as in claim 1 wherein said second transducer means is divided in said longitudinal direction with halves thereof developing in-phase voltages for vibrations in said second transverse direction and out-of-phase voltages for vibrations in said first transverse direction.

3. An angular velocity sensing device as in claim 2 wherein said first and second transducer means are piezoelectric elements bonded to said first and second longitudinal surfaces, respectively.

4. An angular velocity device as in claim 3 wherein a third piezoelectric transducer means is bonded to a third longitudinal surface which is in opposing relationship with said first longitudinal surface, said third transducer means being symmetrically mounted with respect to said first transducer means and energized to produce vibrations in synchronism with the vibrations produced by said first transducer means.

5. An angular velocity sensing device as in claim 4 wherein a fourth piezoelectric transducer means is bonded to a fourth longitudinal surface which is in opposing relationship with said second longitudinal surface, said fourth transducer means being symmetrically mounted with respect to said second transducer means for developing a voltage in response to said rotational motion that is in phase with the voltage generated by said second transducer means.

6. An angular velocity sensing device as in claim 3 wherein said body member is permitted to vibrate with its ends free and is supported at the nodal points of vibration.

7. An angular velocity sensing device as in claim 3 wherein said body member is supported at its ends.

8. An angular velocity sensing device as in claim 3 wherein said body member is a metal rod.

9. An angular velocity sensing device comprising:
   (a) a rod of relatively fixed dimensions composed of a material exhibiting low mechanical loss for vibratory motion, said rod having an approximate 90° rotational symmetry about its longitudinal axis,
   (b) first piezoelectric transducer means divided along said longitudinal axis coupled to said rod,
   (c) drive means for providing a separate energization to each half of said transducer means so as to produce rectilinear vibrations of said rod in a first transverse direction and provide compensation for spurious vibrations in a second transverse direction orthogonal to said first direction that may tend to occur due to a structural imbalance of the device,
   (d) second piezoelectric transducer means divided along said longitudinal axis coupled to said rod for developing from each half in-phase voltages in response to vibrations in said second transverse direction produced by rotational motion of said rod about said longitudinal axis, and for developing cancelling out-of-phase voltages in response to vibrations in said first transverse direction.

10. An angular velocity sensing device comprising:
    (a) a rod of relatively fixed dimensions composed of a material exhibiting low mechanical loss for vibratory motion, said rod having an approximate 90° rotational symmetry about its longitudinal axis,
    (b) first piezoelectric transducer means bonded to a first longitudinal surface of said rod,
    (c) drive means for energizing said first transducer means for producing rectilinear vibrations of said rod in a first transverse direction,
    (d) second piezoelectric transducer means bonded to a second longitudinal surface orthogonally disposed with respect to said first surface, said second transducer means developing a voltage in response to vibrations in a second transverse direction orthogonal to said first direction produced by rotational motion of said rod about said longitudinal axis, and
    (e) output means responsive to said developed voltage for providing an output voltage proportional to the angular velocity of said rotational motion.

11. An angular velocity sensing device as in claim 10 wherein said rod has unequal dimensions in said first and second transverse direction so as to provide slightly unequal resonant frequencies of vibrations in said first and second directions.

12. An angular velocity sensing device as in claim 10 wherein said rod is a metal bar having an approximately square cross section.

13. An angular velocity sensing device as in claim 12 wherein said first transducer means is divided along said longitudinal axis and said drive means includes drive coupling means for providing a separate energization to each half of said first transducer means so as to compensate for spurious vibrations in said second transverse direction that may tend to occur due to a structural imbalance of the device.

14. An angular velocity sensing device as in claim 13 wherein said second transducer means is divided along said longitudinal axis and said output means includes output coupling means for connecting each half of said second transducer means to said output means so as to develop in-phase voltages in response to vibrations in said second transverse direction and develop cancelling out-of-phase voltages in response to vibrations in said first transverse direction.

15. An angular velocity sensing device as in claim 14 wherein said rod is energized at the fundamental resonant frequency of vibrations of the rod in said first transverse direction and which includes support means for supporting said rod at the two intermediate nodal points of vibrations with the ends of the rod left free.

16. An angular velocity sensing device as in claim 14 which includes support means for fixedly supporting said rod at its ends.

17. An angular velocity sensing device as in claim 16 wherein said first transducer means includes a first pair of piezoelectric elements symmetrically mounted in the longitudinal direction, said first pair of piezoelectric elements being energized at the first overtone resonant frequency of vibrations so as to provide nodal points of vibrations at the fixed ends and at the center of the rod.

18. An angular velocity sensing device as in claim 17 wherein said second transducer means includes a second pair of piezoelectric elements symmetrically mounted in the longitudinal direction, said second pair of piezoelectric elements being responsive to first overtone frequency vibrations in the second transverse direction.

19. An angular velocity sensing device comprising:
(a) a rod of relatively fixed dimensions composed of a material exhibiting low mechanical loss for vibratory motion, said rod having an approximate 90° rotational symmetry about its longitudinal axis,
(b) first transducer means coupled to a first longitudinal surface of said rod,
(c) second transducer means coupled to a second longitudinal surface of said rod in opposing relationship with said first surface,
(d) drive means for energizing said first transducer means including an amplifier network connected between said first and second transducer means in a feedback arrangement so as to comprise a stable oscillator circuit whereby there are produced vibrations of said rod at its resonant frequency in a first transverse direction, and
(e) third transducer means coupled to a third longitudinal surface orthogonally disposed with respect to said first and second surfaces, said third transducer means developing a voltage in response to vibrations in a second transverse direction orthogonal to said first direction produced by rotational motion of said rod about said longitudinal axis.

20. An angular velocity sensing device as in claim 19 wherein said first transducer means is divided along said longitudinal axis and said drive means includes drive coupling means for providing a separate energization to each half of said first transducer means so as to compensate for spurious vibrations in said second transverse directions that may tend to occur due to a structural imbalance of the device.

21. An angular velocity sensing device as in claim 20 wherein said rod has unequal dimensions in said first and second transverse directions so as to provide slightly unequal resonant frequencies of vibrations in said first and second directions.

22. An angular velocity sensing device comprising:
(a) an elongated body member of a relatively fixed dimensions composed of a material exhibiting low mechanical loss for vibratory motion, said rod having an approximate 90° rotational symmetry about its longitudinal axis,
(b) first piezoelectric transducer means bonded to a first longitudinal surface of said body member for producing rectilinear vibrations of said body member in a first transverse direction in response to applied energization, and
(c) second piezoelectric transducer means bonded to a second longitudinal surface of said body member orthogonally disposed with respect to said first surface for developing a voltage in response to vibrations in a second transverse direction orthogonal to said first direction which are produced by rotational motion of said body member about its longitudinal axis, whereby in response to said developed voltage an output voltage may be provided that is proportional to the angular velocity of said rotational motion.

23. An angular velocity sensing device as in claim 22 wherein said body member has unequal dimensions in said first and second transverse directions so as to provide slightly unequal resonant frequencies of vibrations in said first and second directions.

References Cited

UNITED STATES PATENTS

| | | | |
|---|---|---|---|
| 2,455,939 | 12/1948 | Meredith | 73—505 |
| 2,544,646 | 3/1951 | Barnaby et al. | 73—505 XR |
| 3,127,775 | 4/1964 | Hansen et al. | 73—505 |
| 3,336,529 | 8/1967 | Tygart | 310—8.2 XR |
| 2,443,471 | 6/1948 | Mason | 333—72 |
| 2,974,530 | 3/1961 | Jaouen | 73—505 |
| 3,258,617 | 6/1966 | Hart. | |

JAMES J. GILL, Primary Examiner